(No Model.)
J. W. HENTZ.
CAR FENDER.
No. 547,578. Patented Oct. 8, 1895.
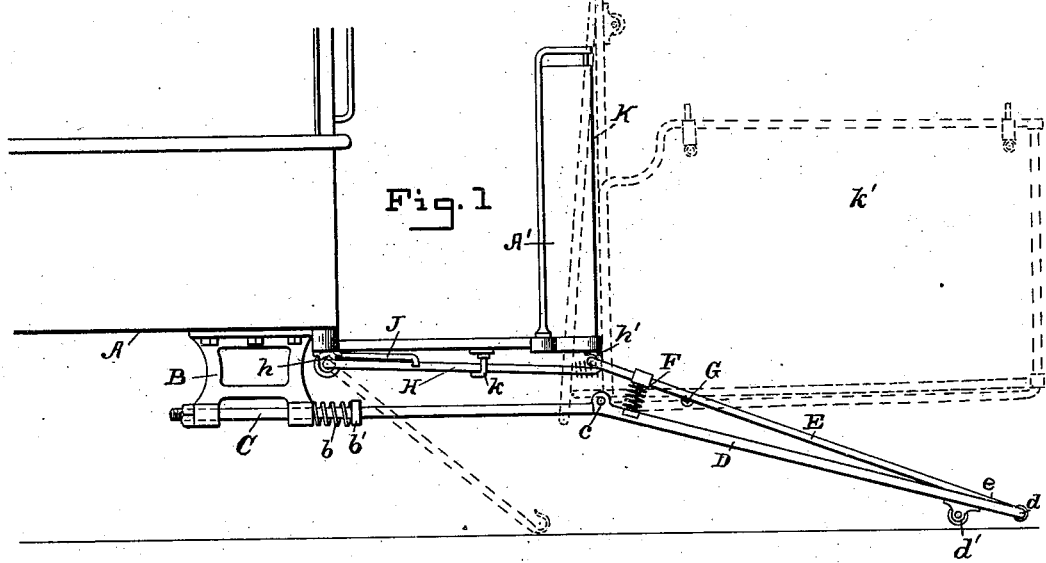
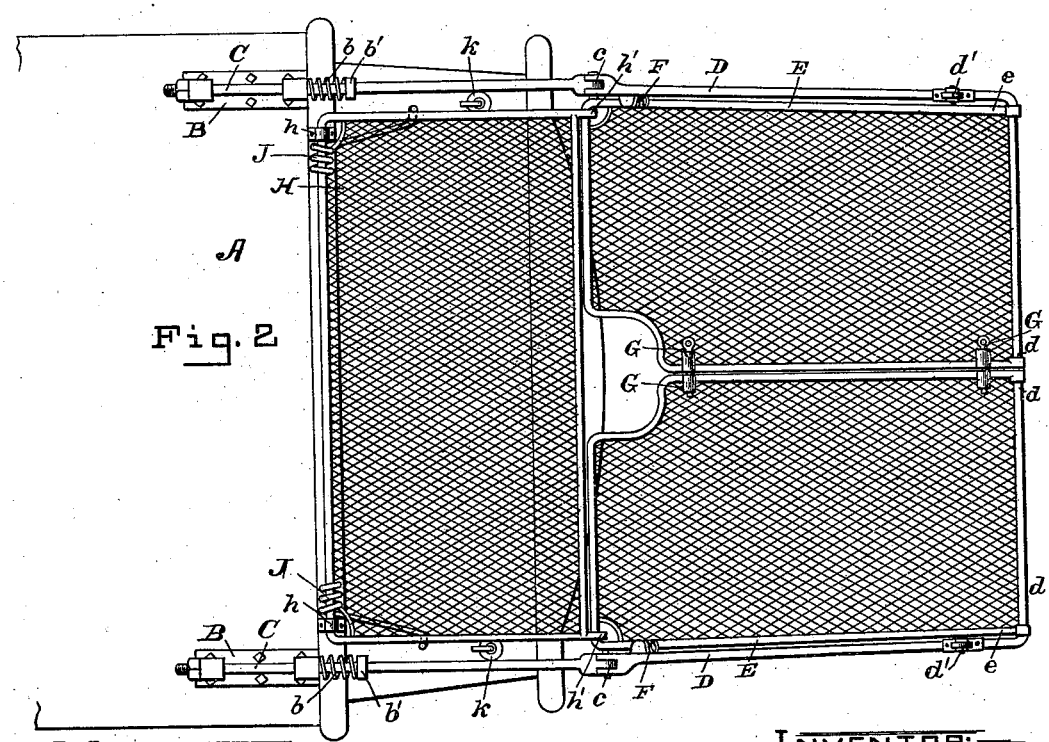
WITNESSES:
A. B. Deggus
L. D. Heinrichs
INVENTOR:
James W. Hentz
By S. Brashears Jr.
ATTORNEY.

UNITED STATES PATENT OFFICE.

JAMES W. HENTZ, OF BALTIMORE, MARYLAND.

CAR-FENDER.

SPECIFICATION forming part of Letters Patent No. 547,578, dated October 8, 1895.

Application filed October 16, 1894. Serial No. 526,053. (No model.)

*To all whom it may concern:*

Be it known that I, JAMES W. HENTZ, a citizen of the United States, residing at Baltimore, in the State of Maryland, have invented certain new and useful Improvements in Car-Fenders; and I do hereby declare the following to be a full, clear, and exact description of the invention, such as will enable others skilled in the art to which it appertains to make and use the same.

My invention relates to wheel-fenders for cars, and has for its object to furnish a fender which will be cheap to construct, easy to adjust, not liable to get out of order, and of few parts.

A further object is to provide a fender which may be folded up against the dashboard of a car, or may be adjusted to act as a fence or guard at both sides of the space between two cars.

With these objects in view my invention consists in the improved construction, arrangement, and combination of parts hereinafter fully described, and afterward specifically pointed out in the claims.

In the accompanying drawings, Figure 1 is a view in side elevation of a car-fender made in accordance with my invention, only so much of the car being shown as is necessary to illustrate the manner of attaching the fender to the car, and the different adjustments of the fender being shown in dotted lines. Fig. 2 is a bottom plan view of my fender and part of a car, the adjustment of parts being the same as is shown in full lines in Fig. 1.

Like letters of reference mark the same parts wherever they occur in both figures of the drawings.

Referring to the drawings by letters, A is the bottom, and A' the front guard or dashboard, of a car. To the bottom A, near each side, is secured two pendent brackets B B, each having bearings to loosely receive a horizontal bar C, which passes through these bearings, has a nut or other device on its rear end to limit its forward movement, and is normally held in its forward position by a spring b, coiled around it and bearing at its rear end against the bracket B and at its front end against collar b', adjustably secured on the rod C. By these means the rods C C are held against vertical or lateral movement, but are permitted to turn on their axes and to have a slight longitudinal movement in their bearings. To the forward end of each rod C, at c, is hinged an L-shaped rod D, the hinges being so constructed that the rods D will be permitted to move freely upward, but will be restrained from moving any farther down than to the position shown in Fig. 1, which will bring its outer end as near the track as it may be practicable to run the front of the fender. The rods D are L-shaped and their front arms d extend toward and abut against each other. Small wheels or rollers d', journaled near the forward end of rods D, are of the proper height to bear upon the rails when the rods are pressed downward and prevent the front parts from coming into actual contact with the rails.

E E are U-shaped net-frames, the legs e e pointing forward and pivoted upon the cross-rods d d at the front. Near their rear ends they are supported by springs F, resting upon rods D D, said springs normally pressing the net-frames upward against the bottom of the platform of the car. These net-frames are provided with bolts G, by means of which they may be connected rigidly at the center and form in effect a single frame when in position, as shown in full lines in Fig. 1.

The structure already described would form a practical fender; but if by accident the obstruction struck should pass under the net it would not be prevented from passing under the wheels. To prevent this last result, I provide an auxiliary fender H, consisting of a rectangular frame carrying a net, pivoted at its rear side to brackets h, depending from the bottom of the car, and provided at its front side with upward-turned hooks h', which engage the rear cross-bars of the U-shaped frames of the main fender. This holds the auxiliary fender H up in the position shown in Fig. 1, and should any obstruction pass under and raise the forward edge of the fender the U-shaped frames will move backward, releasing the hooks h' and permitting the auxiliary fender H to drop to the position shown in dotted lines in Fig. 1, the hooks h' resting in the grooves of the rails. This dropping down is assisted and assured by springs J, bearing upon the side bars of the auxiliary frame.

The hinges c are placed so that when the fender is in its normal or forward position these hinges will be exactly in line with the front guard of the car, so that the fender when on the rear end of a car may be folded up, moving on hinges c until the net rests in the position seen at K in dotted lines in Fig. 1. When it is so placed and at any time when there is no use for the auxiliary fender H, it is held up against the bottom of the car by a turn-button or hook $k$.

When the fender is on the rear end of a car to which a trailer is attached, the bolts G are withdrawn, releasing the frames F F from each other, so that they become independent frames. The rods D are now lifted until they are in line with rods C and each U-shaped fender-section turned to a vertical position, the whole turning in brackets B, when each U-shaped frame forms a guard or fence to guard against the entry of persons, &c., into the space between the cars, as shown at $k'$ in dotted lines in Fig. 1.

Having thus fully described my invention, what I claim as new, and desire to secure by Letters Patent of the United States, is—

1. In a car fender, a rod on each side of the car mounted to turn on its axis, in combination with a fender frame attached to its outer end, such fender frame consisting of two sections joined in line with the center line of the car and made separable on that line, whereby by turning the bars on their axes, the two sections of the fender frame may be turned up to vertical positions to form guards for the space between two cars, substantially as set forth.

2. A car fender made in two sections divided longitudinally, and supported upon longitudinal side rods mounted in bearings under the car whereby they may be turned upon their axes, substantially as set forth.

3. In a car fender longitudinal side rods, L shaped rods pivoted to the forward ends thereof, a net frame pivoted upon the forward cross bar of the L shaped rods and springs resting upon the L shaped rods and supporting the net frame, as set forth.

4. In a car fender longitudinal side rods, L shaped rods pivoted to the forward end thereof, a net frame pivoted upon the forward cross bar of the L shaped rods, springs resting upon the L shaped rods and supporting the net frame, against the bottom of the car, and an auxiliary fender pivoted under the car, having hooks at its forward edge to engage the rear cross rods of the main fender, as set forth.

In testimony whereof I affix my signature in presence of two witnesses.

JAMES W. HENTZ.

Witnesses:
S. BRASHEARS,
C. R. WEAVER.